J. G. LEFFINGWELL.
Lamp Burner.

No. 42,204. Patented April 5, 1864.

Witnesses
James A. Ryont
Walter Frost

Inventor
John G. Leffingwell

UNITED STATES PATENT OFFICE.

JOHN G. LEFFINGWELL, OF NEWARK, NEW JERSEY.

IMPROVEMENT IN BURNERS FOR OIL-LAMPS.

Specification forming part of Letters Patent No. 42,204, dated April 5, 1864.

*To all whom it may concern:*

Be it known that I, JOHN G. LEFFINGWELL, of the city of Newark, in the county of Essex and State of New Jersey, have invented an Improved Mode of Constructing Burners for Oil-Lamps; and I do hereby declare that the following is a full and exact description of the same.

Figure 2:
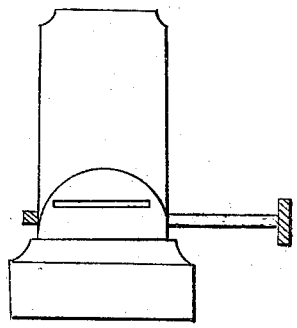
Figure 1:
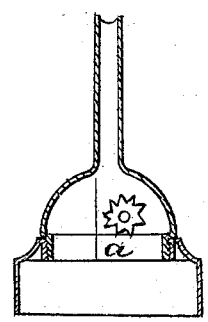
Figure 2:
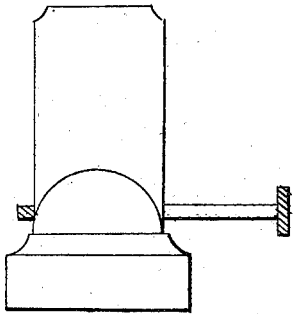
Figure 2:
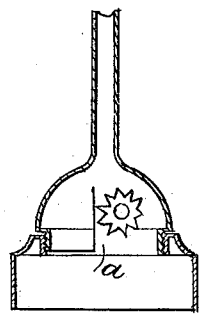

My invention consists in making the wick-tube of a burner of such a form that it will answer the purpose of the body or outside shell, as in Figure 1, or of such a form that it will enclose the ratchet-wheels, as in Fig. 2.

To enable others skilled in the art to make and use my invention, I will proceed to describe its construction and operation.

I make the tubes the same as they are ordinarily made, with the bottom end of the same made to fit the collar, or I make the tubes and chamber for the ratchet-wheels of one piece of metal and the thread part of a suitable thickness for cutting a thread, thus making the whole shell of the burner of two pieces of metal, as in Fig. 2, thus making the outside shell of the burner either of one or two pieces of metal. When made of one piece, I solder in a piece of metal, (marked A, Fig. 1, in the accompanying drawings,) for the purpose of keeping the wick in its place. When made of two pieces of metal, I cut the metal of the bottom or thread part of the burner close to the edge of the thread and turn it up, so as to answer the same purpose as the piece of metal soldered inside the shell, and marked A, Fig. 1. The slots on each side of the tube are for the purpose of keeping the body of the burner cool.

The object of my improvement is to obtain a cheap burner with a ratchet and having the same inclosed.

It is well known that the least number of pieces a burner is made of the cheaper it can be made.

In all burners I have yet seen three pieces of metal are used to make this class of burners, while by my method, as described, I can make them either of one or two, as desired.

I claim—

1. Expanding the bottom end of a wick-tube so as to make the outside shell of a burner and wick-tube of one piece of metal, as described.

2. Expanding the bottom end of a wick-tube, so as to inclose the ratchet-wheels of a burner, as described.

JOHN G. LEFFINGWELL.

Witnesses:
JAMES A. REFORD,
WALTER FROST.